Patented Sept. 7, 1943

2,328,709

UNITED STATES PATENT OFFICE 2,328,709

METHOD FOR STABILIZING ORGANIC THIONITRITES

George S. Crandall, Woodbury, N. J., Richard S. George, State College, Pa., and Edwin M. Nygaard, Woodbury, N. J., assignors to Socony-Vacuum Oil Company, Incorporated, New York, N. Y., a corporation of New York No Drawing. Original application June 27, 1940, Serial No. 342,692. Divided and this application December 27, 1941, Serial No. 424,597

18 Claims. (Cl. 44—53)

This application, which is a division of our copending application Serial No. 342,692, filed June 27, 1940, relates to the stabilization of organic thionitrites and is more particularly concerned with the stabilization of an organic thionitrite in solution in a suitable solvent.

The method of the present invention had its origin in the observation that organic thionitrites were effective to improve the ignition quality of hydrocarbon fuels for compression ignition engines, which was attended by the further observation that the instability of organic thionitrites made their practical value in this regard questionable.

In preparing a fuel blend for compression ignition or Diesel engines with an organic thionitrite, the thionitrite may be added to the fuel in the pure state, it may be added to the fuel in solution in a suitable solvent, or it may be formed in situ in the fuel or in another suitable solvent, which in turn can be blended with the fuel. It is important, therefore, that the organic thionitrite be substantially stable against decomposition both prior to and after its addition to the fuel, and the present invention is broadly directed to a method for effecting such stabilization irrespective of the solvent in which it is dissolved. Typical solvents for the organic thionitrites are ether; carbon disulfide; carbon tetrachloride; and liquid hydrocarbons such as benzene, hexane, and petroleum fractions such as gasoline, kerosene, fuel oils, and heavier fractions such as lubricating oils.

The organic thionitrites are compounds having the general formula RSNO. They may be synthesized in various ways as by the reaction of a mercaptan with nitrosyl chloride, or preferably by the interreaction of a mercaptan with an alkali nitrite and a mineral acid in a non-homogeneous liquid system as described in our copending application Serial No. 338,736, filed June 4, 1940.

Although, as aforesaid, this invention is broadly directed to the stabilization of organic thionitrites in solution irrespective of the solvent, the principal object of the present invention is to provide a method for stabilizing organic thionitrites in Diesel fuel oil blends containing them. The instability of organic thionitrites in Diesel fuel oil solutions manifests itself by the loss of the typical thionitrite color, development of sludge or sludgy materials and loss of the enhanced ignition quality.

Our invention is predicated upon the discovery that a Diesel fuel oil-organic thionitrite blend can be stabilized by admixing therewith a minor proportion of a compound which will prevent the accumulation of the higher oxides of nitrogen in the blend. This may be explained on the theory that the higher oxides of nitrogen apparently accelerate, by catalytic action and by direct reaction, the decomposition of the thionitrite and are instrumental in the formation of sludge and sludgy materials from constituents naturally occurring in the fuel oil.

The compounds which will prevent the accumulation of oxides of nitrogen in the blend may be roughly divided into two classes, depending upon the manner in which their purpose is accomplished. Thus, the accumulation of the higher oxides of nitrogen may be prevented by adding to the blend a compound which will absorb or react with such oxides as they are formed to form stable, harmless products. Also, as will hereinafter appear, this may be accomplished by the addition of a compound which has antioxidant properties: that is, a compound which will act as a negative catalyst toward the oxidation of organic thionitrites or nitric oxide or both.

In further explanation of the foregoing it has been shown (Ber. 59, 1314 (1926)) that organic thionitrites are subject to two types of decomposition: namely,

*Thermal decomposition*, which takes place slowly at room temperature and in which the thionitrite decomposes irreversibly to the disulfide and nitric oxide according to the following equation:

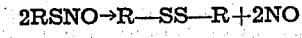

and

*Auto-oxidation*, wherein the thionitrite is rapidly decomposed in the presence of oxygen to the disulfide and nitrogen tetroxide according to the following equation:

The nitric oxide formed in the former decomposition is oxidized to the higher oxides, which, as stated above, apparently act catalytically to accelerate the decomposition of the thionitrite and react with naturally-occurring constituents in the oil, such as unsaturated hydrocarbons, etc., to form sludgy materials. The higher oxides of nitrogen ($N_2O_3$ and $N_2O_4$) also react with many of the thionitrites to set up chain reactions which ultimately lead to sulfonic acids, sulfones, etc., and oxides of nitrogen.

Thus, it will be seen that the various deterioration phenomena may be retarded by adding to the blend a compound which will actually remove the higher oxides of nitrogen as they are formed or which will act as an antioxidant to prevent their formation. We have discovered a general class of compounds which may be readily dissolved in an organic thionitrite solution such as a Diesel fuel oil-thionitrite blend to accomplish the purpose of this invention. Some of these compounds apparently act by absorbing or reacting with the oxides of nitrogen, and others act both as nitrogen oxide absorbers and as antioxidants.

We have found that compounds characterized by the general formula $R(XH)_n$ wherein R represents an alkyl radical; X represents an oxygen or sulphur atom; and $n$ is at least one, effectively prevent the accumulation of oxides of nitrogen in an organic thionitrite solution such as the aforesaid Diesel fuel-thionitrite blend. Typical compounds falling into this group are the aliphatic alcohols such as amyl alcohol (fusel oil), isopropyl alcohol, ethylene glycol, dodecyl alcohol, etc.; the aliphatic mercaptans such as amyl mercaptans, mixed aliphatic mercaptans (from mineral oil), tertiary butyl mercaptan, etc. In this group preference is given to the aliphatic mercaptans, with particular preference to tertiary butyl mercaptan.

The compounds contemplated herein may be classified according to the aforesaid theory of their stabilizing action as follows: the action of the aliphatic alcohols is apparently to remove oxides of nitrogen from the blend; and the action of the aliphatic mercaptans is twofold in that they apparently act as antioxidants and also to remove oxides of nitrogen from the blend.

To demonstrate the efficacy of the compounds contemplated herein as stabilizers for Diesel fuel oil-thionitrite blends, we prepared a Diesel fuel oil blend containing 1% of amyl thionitrite, and representative stabilizers were added to samples of the blend, which were then stored in two sets under different conditions. One set was stored "dry" in glass bottles; the other was stored in glass bottles containing water and an iron nail. The effectiveness of the stabilizer was determined primarily by the length of time during which the red color of the thionitrite persisted and the length of time before there was an appearance of sludge. Table I below gives the results obtained with the samples stored "dry," and Table II sets forth the results obtained with the samples stored over 5% by volume of water with an iron nail in each sample. Both sets of samples were stored at prevailing room temperature.

TABLE I

Samples stored "dry" in glass

| Stabilizer | Per cent added by weight | Days elapsed before appreciable color loss | Days elapsed before appearance of sludge |
|---|---|---|---|
| None | | 5 | 3 |
| Do | | 5 | 5 |
| Fusel oil | 2.5 | 11 | 19+ |
| Isopropyl alcohol | 18.6 | 11 | 56+ |
| Ethylene glycol | 2.5 | 11 | 19+ |
| Amyl mercaptan | 2.5 | 56+ | 56+ |

TABLE II

Samples stored over water in presence of iron

| | | | |
|---|---|---|---|
| None | | <1 | <1 |
| Fusel oil | 2.5 | 8 | 24 |
| Isopropyl alcohol | 2.5 | 8 | 8 |
| Dodecyl alcohol | 2.5 | 8 | 8 |
| Amyl mercaptan | 2.5 | 24 | 24 |
| Mixed mercaptans | 2.5 | 24 | 24 |
| Tertiary butyl mercaptan | 2.5 | 10 | 17+ |

In addition to the foregoing stability tests we have made comparative cetane number determinations on Diesel fuel oil-thionitrite blends containing a representative stabilizing agent (amyl alcohol or fusel oil). In these tests, the results of which are tabulated in Tables III and IV below, we have employed different organic thionitrites in various concentrations as indicated. The fuel oil used for the tests tabulated in Table III was a straight run Diesel oil having an A. P. I. gravity of 40.1 and a cetane number (C. N.) of 52 in the unblended state. The fuel oil used for obtaining the results of Table IV was a catalytically cracked Diesel fuel oil having an A. P. I. gravity of 26.8 and a cetane number of 27. The cetane number determinations were made according to the method described in A. S. T. M. Proc. 38, I, 392 (1938) and were obtained approximately three weeks after preparing the blends. It will be observed that in all cases the blends which contained the thionitrite and the amyl alcohol were far superior to those containing the thionitrite alone and that the amyl alcohol alone had no effect upon the cetane number.

TABLE III

| Sample | Thionitrite added | Per cent by weight | Stabilizer added | Per cent by weight | C. N. | Increase in C. N. |
|---|---|---|---|---|---|---|
| 1(a) | Amyl | 1.0 | None | | 54.0 | 2.0 |
| 1(b) | do | 1.0 | Amyl alcohol | 2.5 | 65.5 | 13.5 |
| 2(a) | do | 0.5 | None | | 58.0 | 6.0 |
| 2(b) | do | 0.5 | Amyl alcohol | 1.25 | 65.5 | 13.5 |
| 3(a) | t-Butyl | 0.25 | None | | 59.0 | 7.0 |
| 3(b) | do | 0.25 | Amyl alcohol | 0.62 | 63.0 | 11.0 |
| 4 | None | | do | 5.0 | 52.0 | 0.0 |

TABLE IV

| 1(a) | t-Butyl | 2.0 | None | | 30.00 | 3.00 |
|---|---|---|---|---|---|---|
| 1(b) | do | 2.0 | Amyl alcohol | 5.0 | 36.0 | 9.0 |
| 2(a) | Ethyl | 2.0 | None | | 31.0 | 4.0 |
| 2(b) | do | 2.0 | Amyl alcohol | 5.0 | 36.5 | 9.5 |
| 3 | None | | do | 10.0 | 27.0 | 0.0 |

In addition to the foregoing data, we have made determinations to show the effectiveness of representative stabilizers over a prolonged (six months) storage period. The fuel used in these tests was the catalytically cracked Diesel fuel oil stock described above in connection with Table IV. The thionitrite was a mixed alkyl thionitrite prepared from a mixture of crude mercaptans obtained from mineral oil. It will be observed from the results in Table V below that the blank —that is, the fuel oil with 1% of the thionitrite— dropped in cetane number from 33 to 29 in the six months' period, losing 4 points in cetane number, while the samples stabilized by the addition of fusel oil lost substantially less in ignition quality.

TABLE V

| Per cent by weight thionitrite | Stabilizer | Per cent by weight | Original C. N. | C. N. after 6 mos. | Change in C. N. |
|---|---|---|---|---|---|
| 1 | None | | 33 | 29 | −4 |
| 5 | Fusel oil | 5 | 34 | 37 | +3 |
| 2 | ---do--- | 2 | 33 | 32 | −1 |

It will be observed from the foregoing results that an organic thionitrite solution such as a Diesel fuel oil blend containing an organic thionitrite may be stabilized against deterioration by the addition thereto of compounds described hereinabove which will prevent the accumulation of oxides of nitrogen in the blend. The effectiveness of the various compounds, characterized by the foregoing general formula, in such an oil blend may be explained either on the theory that they react with or absorb oxides of nitrogen as they are formed, or on the theory that they act as antioxidants to prevent their formation, or both. The stabilizers may be added in varying proportions, depending upon the manner in which they act, the character and amount of thionitrite in the blend, etc., and in general they produce the desired stabilizing effect in amounts ranging from about 0.01 to about 5 times the quantity of thionitrite present in the solution.

We claim:

1. The method of stabilizing an organic thionitrite solution against deterioration which comprises admixing with said solution a minor proportion of a compound having the general formula $R(XH)_n$ in which R represents an alkyl radical, X is selected from the group consisting of oxygen and sulphur, and $n$ represents a whole number equal to at least one.

2. The method of stabilizing an organic thionitrite solution against deterioration which comprises admixing with said solution a minor proportion of an aliphatic mercaptan.

3. The method of stabilizing an organic thionitrite solution against deterioration which comprises admixing with said solution a minor proportion of tertiary butyl mercaptan.

4. The method of stabilizing an organic thionitrite solution against deterioration which comprises admixing with said solution a minor proportion of amyl mercaptan.

5. The method of stabilizing an organic thionitrite solution against deterioration which comprises admixing with said solution a minor proportion of an aliphatic alcohol.

6. The method of stabilizing an organic thionitrite solution against deterioration which comprises admixing with said solution a minor proportion of fusel oil.

7. The method of stabilizing a blend of Diesel fuel and an organic thionitrite against deterioration which comprises admixing with said blend a minor proportion of a compound having the general formula $R(XH)_n$ in which R represents an alkyl radical, X is selected from the group consisting of oxygen and sulphur, and $n$ is a whole number equal to at least one.

8. The method of stabilizing a blend of Diesel fuel and an organic thionitrite against deterioration which comprises admixing with said blend a minor proportion of an aliphatic alcohol.

9. The method of stabilizing a blend of Diesel fuel and an organic thionitrite against deterioration which comprises admixing with said blend a minor proportion of fusel oil.

10. The method of stabilizing a blend of Diesel fuel and an organic thionitrite against deterioration which comprises admixing with said blend a minor proportion of an aliphatic mercaptan.

11. The method of stabilizing a blend of Diesel fuel and an organic thionitrite against deterioration which comprises admixing with said blend a minor proportion of tertiary butyl mercaptan.

12. The method of stabilizing a blend of Diesel fuel and an organic thionitrite against deterioration which comprises admixing with said blend a minor proportion of amyl mercaptan.

13. A Diesel fuel having in admixture therewith an organic thionitrite and a compound having the general formula $R(XH)_n$ in which R represents an alkyl radical, X is selected from the group consisting of oxygen and sulphur, and $n$ is a whole number equal to at least one.

14. A Diesel fuel having in admixture therewith an organic thionitrite and an aliphatic alcohol.

15. A Diesel fuel having in admixture therewith an organic thionitrite and fusel oil.

16. A Diesel fuel having in admixture therewith an organic thionitrite and an aliphatic mercaptan.

17. A Diesel fuel having in admixture therewith an organic thionitrite and tertiary butyl mercaptan.

18. A Diesel fuel having in admixture therewith an organic thionitrite and amyl mercaptan.

GEORGE S. CRANDALL.
RICHARD S. GEORGE.
EDWIN M. NYGAARD.